United States Patent [19]

McGinley et al.

[11] Patent Number: 5,528,408

[45] Date of Patent: Jun. 18, 1996

[54] SMALL FOOTPRINT OPTOELECTRONIC TRANSCEIVER WITH LASER

[75] Inventors: James W. McGinley, Schaumburg; Patrick Gilliland, Chicago; Allan L. Pallarito, Elgin; Rou Farhadieh, Willowbrook; Henning Backhauss, Oak Park, all of Ill.

[73] Assignee: Methode Electronics, Inc., Chicago, Ill.

[21] Appl. No.: 322,073

[22] Filed: Oct. 12, 1994

[51] Int. Cl.$^6$ ................................................. H04B 10/00
[52] U.S. Cl. ......................... 359/152; 359/163; 439/577
[58] Field of Search ................................. 359/152, 163; 439/577

[56] References Cited

U.S. PATENT DOCUMENTS

| | | | |
|---|---|---|---|
| 4,149,072 | 4/1979 | Smith et al. | 250/199 |
| 4,625,333 | 11/1986 | Takezawa | 359/152 |
| 4,989,934 | 2/1991 | Zavracky | 359/152 |
| 5,005,939 | 4/1991 | Arvanitakis et al. | 350/96.20 |
| 5,122,893 | 6/1992 | Tolbert | 359/152 |
| 5,329,428 | 7/1994 | Block et al. | 361/785 |
| 5,329,604 | 7/1994 | Baldwin et al. | 385/92 |

FOREIGN PATENT DOCUMENTS

| | | | |
|---|---|---|---|
| 0314651 | 5/1989 | European Pat. Off. | 359/163 |
| 0437161A2 | 7/1991 | European Pat. Off. | G04B 10/14 |
| 0442608A2 | 8/1991 | European Pat. Off. | G02B 6/42 |
| 0535473A1 | 4/1993 | European Pat. Off. | G02B 6/42 |
| 0588014 | 3/1994 | European Pat. Off. | 359/152 |
| 0600645A1 | 6/1994 | European Pat. Off. | G02B 6/42 |
| 0613032A2 | 8/1994 | European Pat. Off. | G02B 6/42 |
| 0009325 | 1/1988 | Japan | 359/163 |
| 0087837 | 3/1990 | Japan | 359/152 |
| 2288939 | 11/1995 | United Kingdom | H04B 10/14 |
| WO90/14607 | 11/1990 | WIPO | G02B 6/36 |

OTHER PUBLICATIONS

AMP Incorporated, "Lytel Molded–Optronic SC Duplex Transceiver," Dec. 1993, from Catalog 65922.
AT&T Microelectronics, "1408–Type ODL Transceiver," Feb. 1994, preliminary data sheet.
Siemens, "Low–Cost ATM" advertisement.
Sumitomo Electric Fiber Optics Corp., "Transceiver Manufacturers to Support Common Footprint for Desktop FDDI Applications," press release and.
"Low Cost Fiber Physical Layer Medium Dependent Common Transceiver Footprint," data sheet, Jun. 23, 1992.
Japanese Standards Association's "Japanese Industrial Standard F04 Type Connectors for Optical Fiber Cords JIS C 5973", 1990.
Communications Standard dictionary; Definition of the term "Light Emitting diode (LED)".
Ephraim, "Transceiver Module Assembly", IBM Tech Disclosure vol. 22, No. 5 pp. 2077–2078, Oct. 1979.
"Transmitter/receiver assembly simplefies use of fiber optics" Design Engineering, Apr. 1980 p. 19.
Weik, "Communications Standard Dictionary" 1983 p. 454.

*Primary Examiner*—Leslie Pascal
*Attorney, Agent, or Firm*—David L. Newman

[57] ABSTRACT

An optoelectronic transceiver having a small footprint and including a laser diode package contained within a subassembly mounted within a housing of the transceiver. The housing includes latches for retaining subassemblies therein. Subassemblies include first apertures for receiving mounting pins to lock the subassemblies within the housing. Plug latch members are mounted onto the subassemblies. Optical transmitter and receiver circuits and one row of nine contacts are mounted to a printed circuit board mounted within the housing of the transceiver.

16 Claims, 4 Drawing Sheets

5,528,408

SMALL FOOTPRINT OPTOELECTRONIC TRANSCEIVER WITH LASER

BACKGROUND OF THE INVENTION

The present invention relates to optoelectronic interface systems and more particularly to an optoelectronic transceiver with a laser diode package.

An optoelectronic transceiver having a small footprint is known generally as a 1×9 package. Such transceivers are used in desktop Fiber Distributed Data Interface (FDDDI) applications. The transceivers having a common footprint are used for Low Cost Fiber Physical Layer Medium Dependent (LCF-PMD) FDDI products such as workstations and personal computers. An LCF-PMD FDDI proposed draft is being developed by the American National Standards Institute (ANSI) X3T9.5 Task Group. Such transceivers interconnect with duplex SC style connectors and interface directly with FDDI integrated circuit (IC) chip sets. SC fiber optic connectors are covered by Japanese Industrial Standard C 5973. The FDDI standard supports transmission rates of up to 100 megabits per second. Such transceivers are compatible with ATM, Sonet and Fiber Channel communication Standards. Such transceivers commonly use LEDs (light emitting diodes) to transmit light over optical fibers at megabit transmission rates. These common transceiver packages also require complicated and expensive assemblies.

Accordingly, it is desired that an optoelectronic transceiver having higher transmission rates and an easily and inexpensively manufactured and assembled package be provided.

SUMMARY OF THE INVENTION

Therefore, it is an object of the present invention to provide an optoelectronic transceiver having transmission rates as high as 1.5 gigabits per second.

It is another object of the present invention to provide an optoelectronic transceiver including an easily assembled package.

It is a further object of the present invention to provide an optoelectronic transceiver having a means for locking an optical subassembly within the housing of the transceiver package.

The present invention comprises a housing having a first end for receiving a fiber optic plug and a second end for mounting a circuit board. A laser diode package is mounted in the second end. A plug latch is mounted in the first end. The plug latch is held between a subassembly and the housing. The subassembly contains the laser diode package. The subassembly includes a first aperture for receiving a mounting pin. The housing includes a second aperture for receiving the pin wherein insertion of the pin through the second aperture locks the subassembly within the housing.

These and other features of the invention are set forth below in the following detailed description of the presently preferred embodiments.

DETAILED DESCRIPTION OF THE PRESENTLY PREFERRED EMBODIMENTS

Figure 1:
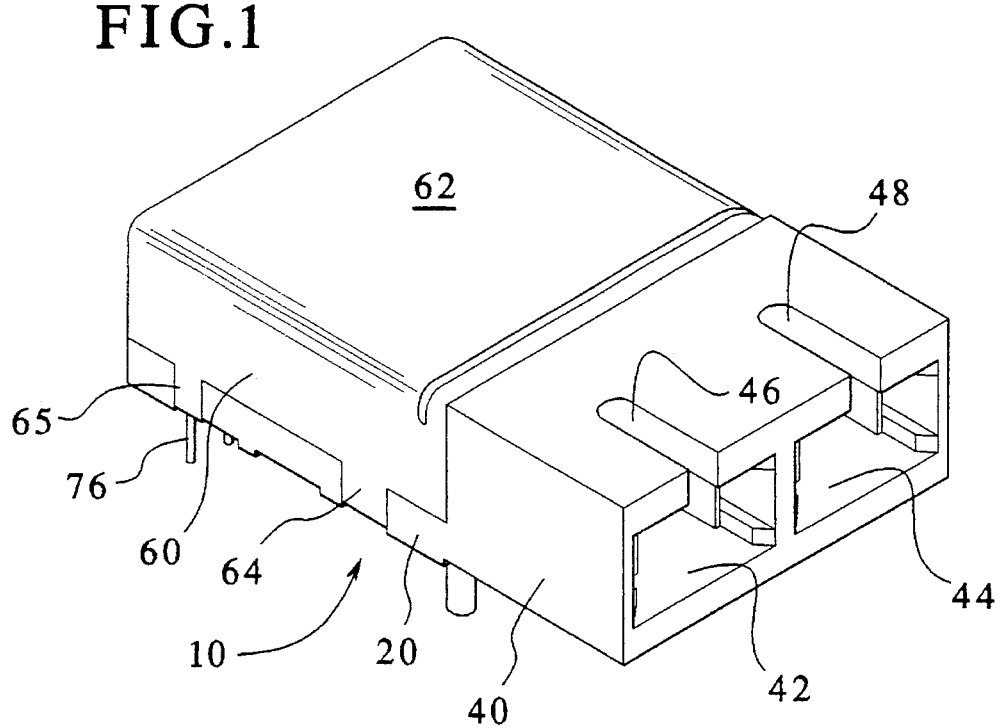
FIG. 1 is a perspective view of an optoelectronic transceiver of the present invention.

A preferred embodiment of the present invention is best shown in FIGS. 1–7. Turning to FIG. 1, an optoelectronic transceiver 10 is shown having a housing 20 preferably injection molded of a plastic material such as reinforced Ultem or Lexan. The housing 20 includes a first end 40 and a second end 60. The first end 40 includes receptacles 42,44 for receiving fiber optic connector plugs. In a preferred embodiment, the receptacles 42,44 will receive an SC duplex plug. The receptacle openings 42,44 are specifically dimensioned for receiving the SC plugs. For example, keying channels 46,48 are provided to ensure that the SC plugs are inserted properly. Generally, receptacle 42 is for the transmitting plug and receptacle 44 is for the receiving plug. The center lines of the receptacles 42,44 are spaced 12.70 mm from each other in a preferred embodiment. The overall optoelectronic transceiver 10 is 25.40 mm×39.12 mm in a preferred embodiment and the housing is 12.0 mm thick.

The second end 60 of the transceiver includes a cover 62 which provides for protection of the active devices and for shielding purposes. The cover 62 includes retaining tabs 64 and 65 (other tabs shown in FIG. 2).

Figure 2:
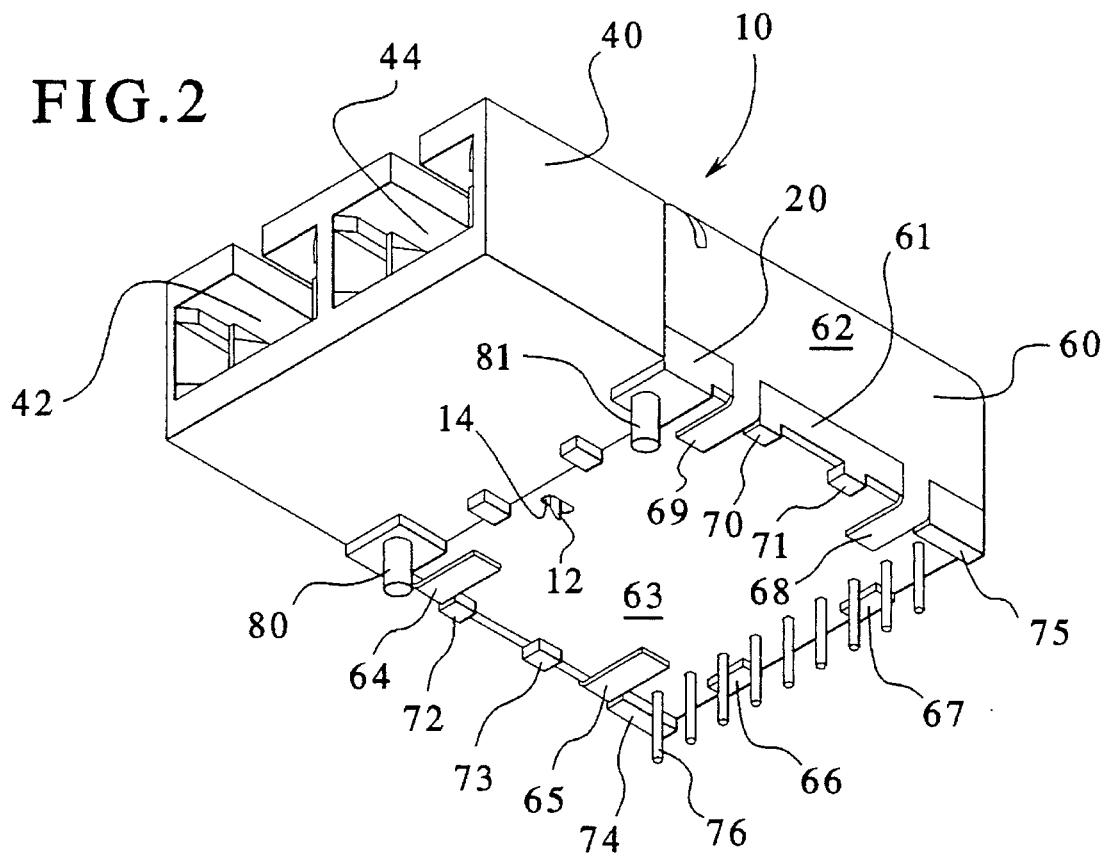
FIG. 2 is a bottom perspective view of the optoelectronic transceiver of the present invention.

FIG. 2 shows a bottom perspective view of an optoelectronic transceiver of the present invention. The housing 20 having first end 40 and second end 60 is shown. In a preferred embodiment, the second end 60 of the housing 20 includes a rear frame portion 61 which is integrally molded with the front end 40. Receptacles 42, 44 are included at first end 40. At second end 60, mounted on the frame 61 is a printed circuit board 63 which is retained within the housing 20 via fingers 70,71,72,73, 74 and 75. The printed circuit board is secured to the housing via retention peg 12 engaging slot 14 formed in the printed circuit board 63. The cover 62 is secured to the housing 20 via tabs 64,65,66,67,68 and 69. Mounting pins 80,81 protrude from the housing 20 and provide for the mounting of the transceiver 20, to a motherboard (not shown) and serve as a preestablished footprint guideline. Contacts 76 protrude from the printed circuit board 63 and also are spaced to mount on a motherboard according to a preestablished footprint. Specifically, there is one row of nine contacts 76, i.e., a "1×9 package" spaced on 2.54 mm centers on the printed circuit board 63, 20.32 mm from the mounting pins 80,81 of the optoelectronic transceiver 10.

Figure 3:
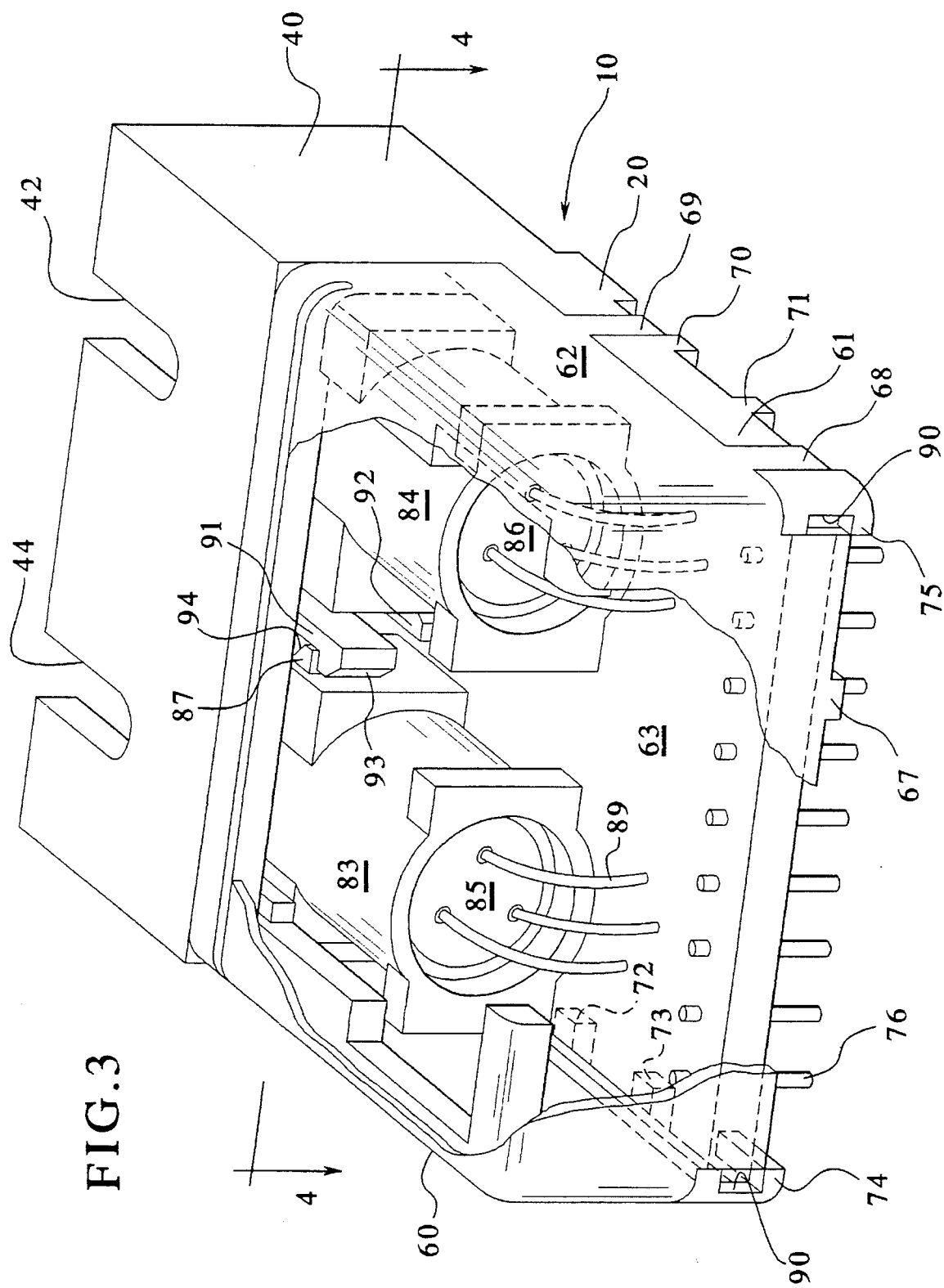
FIG. 3 is an enlarged cut-away view of an optoelectronic transceiver of the present invention.

Turning to FIG. 3, a perspective view of the optoelectronic transceiver 10 is shown having the cover 62 cut-away. Whereas FIG. 1 is a perspective view of the transceiver 10 taken from the first end 40, FIG. 3 is a perspective view taken from second end 60, so that receptacle 42 and 44 are facing away. Housing 20 includes frame 61 surrounding second end 60. Covering the frame 61 is cover 62. The cover is secured to the frame via tabs 64,65,66 (see FIG. 2),67,68 and 69. Mounted on the frame 61 is printed circuit board 63. In a preferred embodiment, the printed circuit board 63 is slid into the frame 61 along channels 90 and supported by fingers 70,71,72,73,74, and 75. Contact pins 76 are mounted in the printed circuit board 63. Any type of electrical connector could be used to provide for the contacts 76.

Optical subassemblies 83,84 are mounted within housing 20. The subassemblies 83,84 include a laser diode package 86 and a photo diode package 85. In a preferred embodiment, a TO 56 laser diode package and a TO 18 photo diode package is mounted to the optical subassembly 84. Diode leads 89 exit the rear of the diode packages 85,86. Diode leads may be attached to the printed circuit board 63 via surface mount or through-hole. Such a preferred embodiment has been tested and provided error free performance to 1.5 Gb/s at 10 dB attenuation, with a mean wavelength of 780 nm to 870 nm with transmitted optical power at −0.5±1.0 dBm with sensitivity measurements of −14 dBm, total linkjitter of 125 ps and avenge rise and fall times ($T_r$, $T_f$) of 350 ps. In a preferred embodiment, circuitry was incorporated with the laser diode to enhance performance as outlined in U.S. Pat. No. 4,541,685 which is incorporated herein by reference.

The housing 20 includes first latch arm 91 and second latch arm 92 for mounting the optical subassemblies 83,84 to the housing 20. Subassembly 83 includes projection 87 for engaging first latch 91. A corresponding detente protrudes from optical subassembly 84 for mating with second latch 92. Latches 91,92 include an angled head 93 for slidingly engaging the angled surface 94 of the projection 87 upon insertion of the subassembly 83 into the housing 20. Upon insertion of the subassembly 83, angled surface 94 will rub against angled head 93 of first latch 91 forcing the first latch 91 to flex outwardly as the projection 87 slides past. Upon the subassembly 83 reaching its fully mated position, the latch 91 will spring back and block projection 87 so that the subassembly 83 is secured within the housing. In this way, the assembly of the transceiver 10 is achieved quickly and easily.

Figure 4:
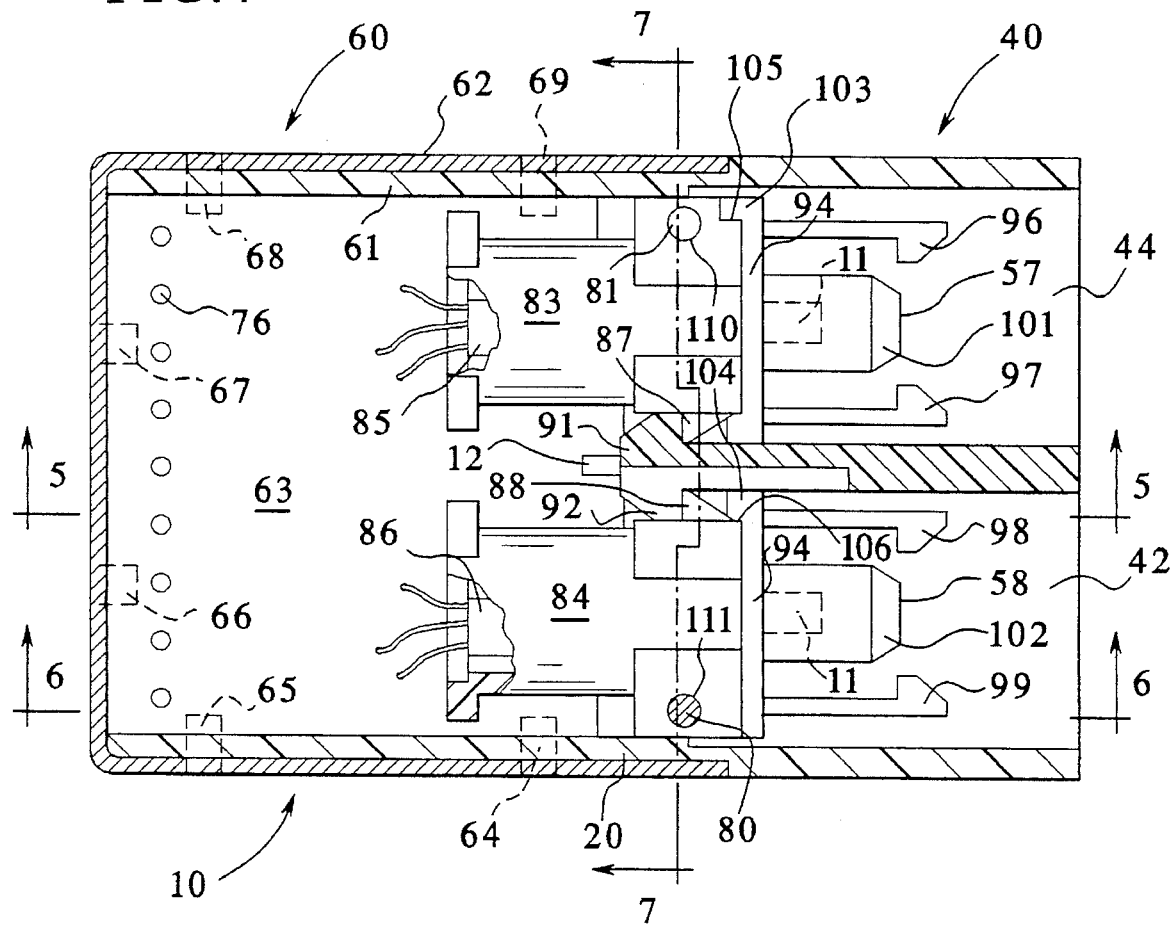
FIG. 4 is a plan view of the optoelectronic transceiver of FIG. 3 taken at line 4—4.

Turning to FIG. 4 a plan view of the optoelectronic transceiver 10 is shown, taken at line 4-4 of FIG. 3. The housing 20 is shown having first end 40 and second end 60. Frame 61 is shown partially surrounding the transceiver package 10. Receptacle 42 and 44 are shown at the first end 40. Printed circuit board 63 is mounted within the second end 60 along channel 90 (see FIG. 3) of the frame 61. The printed circuit board 63 includes space for transmitter and receiver circuitry. The cover 62 is shown having tabs 64,65, 66,67,68 and 69. The housing 20 includes first latch 91 and second latch 92. In a preferred embodiment, latches 91,92 are integrally molded with the housing 20. Subassemblies 83,84 are mounted within the housing 20. Captured by each subassembly 83,84 is a plug latch 57,58. In a preferred embodiment, the plug latch 57,58 receives an SC plug via plug latch members 96,97,98 and 99. The latch plugs 57,58 include rear wall 94 which abuts against subassembly 83,84. The latch plug 57,58 is mounted to subassemblies 83,84 via a friction fit of a rod 11,11 of the subassemblies 83,84 which are inserted within the ferrule receiving portion 101,102 of the plug latch 57,58. The plug latch 57,58 is further mounted to the subassembly 83,84 via an arm 103,104 which engages channels 105,106 of the subassemblies 83,84, respectively. As the plug latches 57,58 are mounted to the rods 11,11 of the subassemblies 83,84, plug latches 57,58 are limited from rotating on the rods 11,11 via the arms 103,1134. The insertion of the arms 103,104 into the channels 105,106 prohibit the plug latches 57,58 from rotating when mounted to the rods 11,11 of subassemblies 83,84.

The subassemblies are mounted into the housing 20 via first latch 91 engaging projection 87 of subassembly 83 and second latch 92 engaging detente 88 of subassembly 84. Subassemblies 83,84 include photo diode package 85 and laser diode package 86, respectively. Subassemblies 83,84 include first apemares 110,111, which receive the mounting pins 80,81. After the subassembly 83,84 is mounted within the housing 10 (see FIG. 3), it is secured therein by mounting pins 80,81. The mounting pins 80,81 are inserted through a second aperture in the bottom of the housing and through first apertures 110, 111 to lock the subassemblies 83,84 within the housing. This use of the mounting pins 80,81 to lock the subassemblies 83,84 within the housing prevents the subassemblies 83,84 and plug latches 57,58 from moving axially or radially within the housing.

Figure 5:
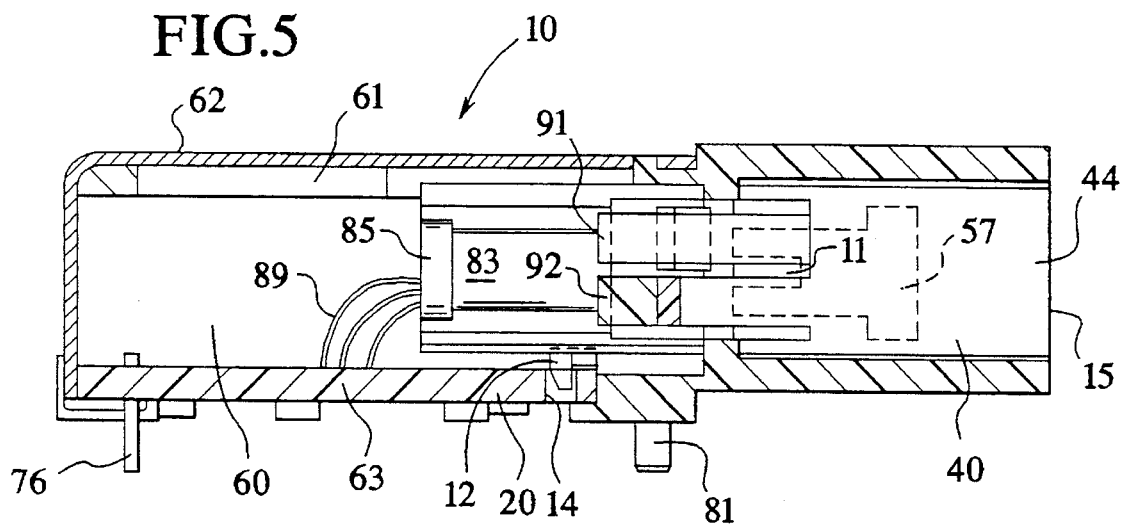
FIG. 5 is a side elevation view of the optoelectronic transceiver of FIG. 4 taken at line 5—5.

FIG. 5 is a side elevation cut-away view of the transceiver 10 taken at line 5—5 of FIG. 4. The housing 20 is shown with first end 40 and second end 60. Receptacle 44 is shown at first end 40 having plug latch 57 therein for receiving an optical connector plug. The plug latch 57 is mounted to subassembly 83 which is mounted to the housing via first latch 91. Second latch 92 receives subassembly 84 (not shown). Photo diode package 85 is shown mounted to subassembly 83 having diode leads 89 which attach to printed circuit board 63. Contacts 76 are mounted within printed circuit board 63. The printed circuit board 63 is secured to the housing 20 via retention peg 12 which is a flexible member which engages slot 14 of the printed circuit board 63. Cover 62 is mounted on frame 61 of the housing 20. Mounting pin 81 is shown inserted within the housing 20 and serves to lock subassembly 83 within housing 20 and also mount housing 20 to a motherboard. In a preferred embodiment, the mounting pins 80,81 are spaced 20.32 mm from the center line of contacts 76 and 15.88 mm from the front end 15 of the housing 20.

Figure 6:
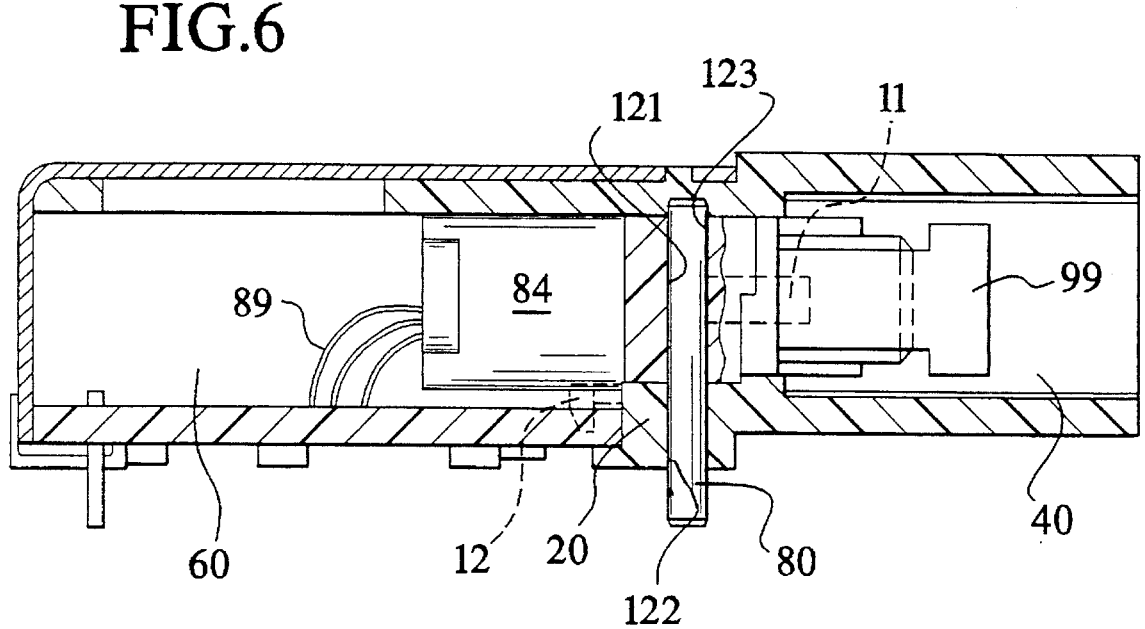
FIG. 6 is a side elevation view of the optoelectronic transceiver of FIG. 4 taken at line 6—6.

FIG. 6 is a further cut-away side elevation view of the transceiver 10 taken at line 6—6 of FIG. 4. Housing 20 is shown having first end 40 and second end 60. Mounted to the housing 20 is subassembly 84. Mounted to the subassembly is plug latch 58 including plug latch member 99 for receiving a fiber optic connector plug. The subassembly 84 includes a first aperture 121 which is co-linear with second aperture 122 of the housing 20. The mounting pin 80 is inserted through the second aperture 122 of the housing and through the first aperture 121 of the subassembly 84 and attains full insertion when the head of the pin reaches third aperture 123. Upon insertion of the mounting pin 80, the subassembly 84 is locked within the housing. The mounting pin 80 may be secured within the apertures 121,122,123 via any means including a friction fit or retention lip on the pin or housing or subassembly 80. The mounting pin 80 also acts to mount the transceiver 10 to a motherboard.

Figure 7:
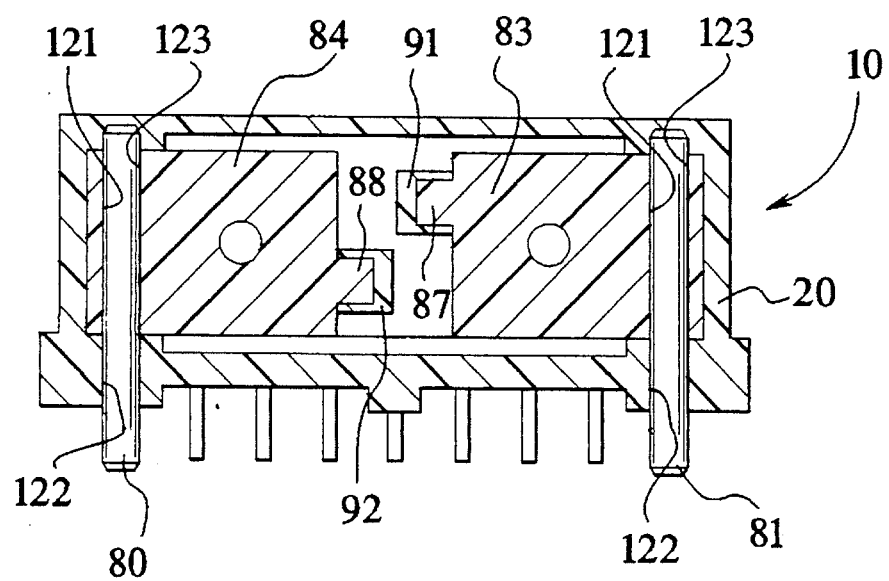
FIG. 7 is an end view of the optoelectronic transceiver of FIG. 5 taken at line 7-7.

FIG. 7 shows a cut-away end view of the transceiver 10 showing housing 20 and subassemblies 83,84 mounted therein. First apertures 121,121 are shown in the subassemblies 83,84, second apertures 122,122 are shown in the housing 20, and third apertures 123,123 are shown in the housing 20. Mounting pins 80,81 are shown inserted through second aperture 122 of the housing, through first aperture 121 of the subassembly 84,83 and into the third aperture 123,123 of the housing 10. It can be seen that the mounting pins 80,81 lock the subassemblies 83,84 within the housing 10 and restrict all axial and radial movement of the subassemblies 83,84. Projections 87,88 are shown engaged with the first latch 91 and second latch 92 of the housing 20.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An optoelectronic transceiver comprising:

a housing having a first end and a second end, the first end having an SC duplex fiber optic receptacle;

a printed circuit board mounted at said second end and having circuitry connected to one row of nine contacts mounted to the printed circuit board;

an optical subassembly mounted within said second end of said housing connected to the circuitry; and a laser diode subassembly mounted within said optical subassembly.

2. The optoelectronic transceiver of claim 1 wherein said housing includes latch members for retaining said optical subassembly.

3. The optoelectronic transceiver of claim 1 wherein said laser diode subassembly transmits at speeds of 1.0 Gb/s.

4. The optoelectronic transceiver of claim 1 wherein said photo diode package receives at speeds of 1.0 Gb/s.

5. The optoelectronic transceiver of claim 1 wherein said second end is enclosed by a cover.

6. The optoelectronic transceiver of claim 5 wherein said cover includes tabs for mounting said cover to said housing.

7. The optoelectronic transceiver of claim 1 wherein a plug latch is mounted to an optical subassembly and the optical subassembly includes a channel for receiving an arm of the plug latch to retain the plug latch thereon.

8. The optoelectronic transceiver of claim 1 wherein said optical subassembly includes a means for locking said optical subassembly within said housing.

9. The optoelectronic transceiver of claim 8 wherein said locking means provides for locking said optical subassembly with said housing and also mounting said housing to a motherboard.

10. The optoelectronic transceiver of claim 9 wherein said locking means includes a mounting pin inserted within a first aperture of said optical subassembly and a second aperture of said housing in order to lockingly mount said optical subassembly to said housing.

11. The optoelectronic transceiver of claim 10 wherein said mounting pin is received by a third aperture of said housing.

12. The optoelectronic transceiver of claim 10 wherein two mounting pins are inserted within said transceiver.

13. The optoelectronic transceiver of claim 1 wherein said optical subassembly includes a rod for receiving a plug latch thereon.

14. The optoelectronic transceiver of claim 1 wherein said printed circuit board is mounted on fingers extending from said housing.

15. The optoelectronic transceiver of claim 1 wherein said housing second end includes a channel for receiving a printed circuit board.

16. The optoelectronic transceiver of claim 1 wherein a retention peg protrudes from said housing and is received by a slot of said printed circuit board.

* * * * *

(12) EX PARTE REEXAMINATION CERTIFICATE (5206th)
United States Patent
McGinley et al.

(10) Number: US 5,528,408 C1
(45) Certificate Issued: Sep. 27, 2005

(54) SMALL FOOTPRINT OPTOELECTRONIC TRANSCEIVER WITH LASER

(75) Inventors: James W. McGinley, Schaumburg, IL (US); Patrick Gilliland, Chicago, IL (US); Allan L. Pallarito, Elgin, IL (US); Rou Farhadieh, Willowbrook, IL (US); Henning Backhauss, Oak Park, IL (US)

(73) Assignee: Methode Electronics, Inc., Chicago, IL (US)

Reexamination Request:
No. 90/005,020, Jun. 16, 1998

Reexamination Certificate for:
Patent No.: 5,528,408
Issued: Jun. 18, 1996
Appl. No.: 08/322,073
Filed: Oct. 12, 1994

(51) Int. Cl.$^7$ .................... H04B 10/00; H04B 10/24
(52) U.S. Cl. ................ 398/139; 398/135; 398/163; 398/164; 439/577
(58) Field of Search ................ 359/152, 163; 439/577

(56) References Cited

U.S. PATENT DOCUMENTS

| 4,149,072 A | | 4/1979 | Smith et al. ............... 250/199 |
| 4,294,682 A | | 10/1981 | Deczky ................... 455/607 |
| 4,301,543 A | | 11/1981 | Palmer .................... 455/612 |
| 4,625,333 A | | 11/1986 | Takezawa ................. 359/152 |
| 4,641,371 A | | 2/1987 | Shutterly ................. 455/601 |
| 4,750,091 A | * | 6/1988 | Van Hout .................. 361/395 |
| 4,798,440 A | | 1/1989 | Hoffer et al. .............. 350/96.2 |
| 4,838,630 A | | 6/1989 | Jannson et al. ............ 350/3.7 |
| 4,872,736 A | | 10/1989 | Myers et al. .............. 350/96.2 |
| 4,912,521 A | | 3/1990 | Almquist et al. ......... 350/96.11 |
| 4,971,571 A | * | 11/1990 | Puerner .................. 439/372 X |
| 4,979,787 A | | 12/1990 | Lichtenberger ............ 361/397 |
| 4,989,934 A | | 2/1991 | Zavarcky .................. 359/152 |
| 5,005,939 A | | 4/1991 | Arvanitakis et al. ........ 350/96.2 |
| 5,011,246 A | | 4/1991 | Corradetti et al. .......... 350/96.2 |

(Continued)

FOREIGN PATENT DOCUMENTS

| EP | 0314651 | 5/1989 | ............... 359/163 |
| EP | 0437141 A2 | 7/1991 | ........... G04B/10/14 |
| EP | 0442608 A2 | 8/1991 | ............ G02B/6/42 |
| EP | 0535473 A1 | 4/1993 | ............ G02B/6/42 |
| EP | 0 530 791 A2 | 10/1993 | |
| EP | 058814 | 3/1994 | ............... 359/152 |
| EP | 0600645 A1 | 6/1994 | ............ G02B/6/42 |
| EP | 0613032 A2 | 8/1994 | ............ G02B/6/42 |
| GB | 2288939 | 11/1995 | ........... H04B/10/14 |
| JP | 0009325 | 1/1988 | ............... 359/163 |
| JP | 0087837 | 3/1990 | ............... 359/152 |
| JP | 2-181710 | 7/1990 | |
| JP | 3-20458 | 2/1991 | |
| JP | 4-122905 | 4/1992 | |
| JP | 4-211208 | 8/1992 | |
| JP | 5-52802 | 7/1993 | |
| JP | 5-218581 | 8/1993 | |
| WO | WO90/14607 | 11/1990 | ............ G02B/6/36 |

OTHER PUBLICATIONS

American National Standard Institutes, Fibre Distributed Data Interface (FDDI) Token Ring Low–Cost Fibre Physical Layer Medium Dependent (LCF–PMD) report—approval date Sep. 25, 1995.

GLM Family—Printed Feb. 16, 1994, Gigabaud Link Module Family (GLM, HGLM, QGLM & EGLM).

MGLM–1063–X–AL Gigabit Link Module Brochure #910026A—Data Code 8 1 98.

(Continued)

*Primary Examiner*—Leslie Pascal

(57) ABSTRACT

An optoelectronic transceiver having a small footprint and including a laser diode package contained within a subassembly mounted within a housing of the transceiver. The housing includes latches for retaining subassemblies therein. Subassemblies include first apertures for receiving mounting pins to lock the subassemblies within the housing. Plug latch members are mounted onto the subassemblies. Optical transmitter and receiver circuits and one row of nine contacts are mounted to a printed circuit board mounted within the housing of the transceiver.

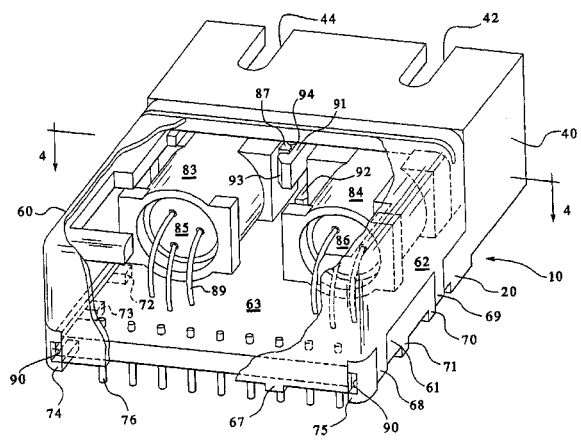

U.S. PATENT DOCUMENTS

| | | | |
|---|---|---|---|
| 5,019,769 A | 5/1991 | Levinson | 372/31 |
| 5,039,194 A | 8/1991 | Block et al. | 385/88 |
| 5,047,835 A | 9/1991 | Change | 357/74 |
| 5,071,219 A | 12/1991 | Yurtin et al. | 385/78 |
| 5,082,344 A | 1/1992 | Mulholland et al. | 385/60 |
| 5,117,476 A | 5/1992 | Yingst et al. | 385/90 |
| 5,122,893 A | 6/1992 | Tolbert | 359/152 |
| 5,127,071 A | 6/1992 | Go | 385/73 |
| 5,134,679 A | 7/1992 | Robin et al. | 385/90 |
| 5,140,663 A | 8/1992 | Edwards et al. | 385/90 |
| 5,195,156 A | 3/1993 | Freeman et al. | 385/92 |
| 5,247,532 A | 9/1993 | Levinson | 372/38 |
| 5,253,096 A | 10/1993 | Freeman et al. | 359/184 |
| 5,285,512 A | 2/1994 | Duncan et al. | 385/94 |
| 5,315,679 A | 5/1994 | Baldwin et al. | 385/76 |
| 5,325,454 A | 6/1994 | Rittles et al. | 385/76 |
| 5,325,455 A | 6/1994 | Henson et al. | 385/89 |
| 5,329,428 A | 7/1994 | Block et al. | 361/785 |
| 5,329,604 A | 7/1994 | Baldwin et al. | 385/92 |
| 5,333,221 A | 7/1994 | Briggs et al. | 385/55 |
| 5,375,040 A * | 12/1994 | Cooper et al. | 361/730 |
| 5,398,295 A | 3/1995 | Chang et al. | 385/58 |
| 5,428,703 A | 6/1995 | Lee | 385/78 |
| 5,475,783 A | 12/1995 | Kurashima | 385/92 |
| 5,479,288 A | 12/1995 | Ishizuka et al. | 359/163 |
| 5,526,160 A | 6/1996 | Watanabe et al. | 359/163 |
| 5,535,034 A | 7/1996 | Taniguchi | 359/152 |
| 5,604,831 A | 2/1997 | Dittman et al. | 385/88 |
| 5,675,428 A * | 10/1997 | Henmi | 359/161 |

OTHER PUBLICATIONS

AMP Incorporated, "Lytel Molded–Optronic SC Duplex Transceiver," Dec. 1993, from Catalog 65922.

AT&T Microelectronics, "1408–Type ODL Transceiver," Feb. 1994, preliminary data sheet.

Siemens, "Low–Cost ATM" advertisement.

Sumitomo Electric Fiber Optics Corp., "Transceiver Manufacturers to Support Common Footprint for Desktop FDDI Applications," press release.

"Low Cost Fiber Physical Layer Medium Dependent Common Transceiver Footprint," data sheet, Jun. 23, 1992.

Japanese Standards Association's "Japanese Industrial Standard F04 Type Connectors for Optical Fiber Cords JIS C 5973", 1990.

Communications Standard dictionary; Definition of the term "Lighting Emitting diode (LED)".

Emphraim, "Transceiver Module Assembly", IBM Tech Disclosure vol. 22 No. 5 pp. 2077–2078, Oct. 1979.

"Transmitter/receiver assembly simplefies use of fiber optics" Design Engineering, Apr. 1980 p. 19.

Weik, "Communications Standard Dictionary" 1983 p. 454.

E–Systems, Melpar Division; Proprietary Data Proposal for Multi–Chip Integration (MCI) May 11, 1993, pp. 1–41.

Active Component Manufacturers Lower the Cost of Fiber to the Desktop Lightwave—Feb. 1994.

Raylan Joins Low–Wavelength Push—850–nm transceiver Electronic Engineering Times—Aug. 1993.

HP Module HFBR–5103, Jun. 1993.

VHDR Optical Transceiver Module for Workstation Applications, May 11, 1993, E–Systems.

"An Optical Data Link Using a CD Laser", SPIE vol. 1577 High–Speed Fiber Networks and Channels (1991), Soderstrom et al, pp 163–173.

Optical Datalinks, AT&T Technical Journal (Jan./Feb. 1992) Daniel J. Wassner, pp 46–52.

"CD Laser Optical Data Links for Workstations and Midrange Computers", (1993 IEEE) Soderstrom et al., pp 505–509.

"Optical Components and Electronic Packaging for High Performance Optical Data Links", (Unknown), Soderstrom et al., 1991.

"A Minaturized Fiber Optic Laser Receptacle Using a Compact Disc (CD) Laser as a Low–Cost", Reliable Source, FOC/Lan 1987, Soderstrom et al., pp 383–385.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 10–29:

An optoelectronic transceiver having a small footprint is known generally as a 1×9 package. Such tranceivers are used in desktop Fiber Distributed Data Interface (FDD[D]I) applications. The transceivers having a common footprint are used for Low Cost Fiber Physical Layer Medium Dependent (LCF-PMD) FDDI products such as workstations and personal computers. An LCF-PMD FDDI proposed draft is being developed by the American National Standards Institute (ANSI) X3T9.5 Task Group. Such transceivers interconnect with duplex SC style connectors and interface directly with FDDI integrated circuit (IC) chip sets. SC fiber optic connectors are covered by Japanese Industrial Standard C 5973. The FDDI standard supports transmission rates of up to 100 megabits per second. Such transceivers are compatible with ATM, Sonet and Fiber Channel communication Standards. Such transceivers commonly use LEDs (light emitting diodes) to transmit light over optical fibers at megabit transmission rates. These common transceiver packages also require complicated and expensive assemblies.

Column 4, lines 1–14:

The subassemblies are mounted into the housing 20 via first latch 91 engaging projection 87 of subassembly 83 and second latch 92 engaging detente 88 of subassembly 84. Subassemblies 83,84 include photo diode package 85 and laser diode package 86, respectively. Subassemblies 83,84 include first [apemares] *apertures* 110,111, which receive the mounting pins 80,81. After the subassembly 83,84 is mounted within the housing 10 (see FIG. 3), it is secured therein by mounting pins 80,81. The mounting pins 80,81 are inserted through a second aperture in the bottom of the housing and through first apertures 110, 111 to lock the subassemblies 83,84 within the housing. This use of the mounting pins 80,81 to lock the subassemblies 83,84 within the housing prevents the subassemblies 83,84 and plug latches 57,58 from moving axially or radially within the housing.

AS A RESULT OF REEXAMINATION, IT HAS BEEN DETERMINED THAT:

Claims 1–16 are cancelled.

\* \* \* \* \*